US011859418B2

(12) United States Patent
Okawa et al.

(10) Patent No.: US 11,859,418 B2
(45) Date of Patent: Jan. 2, 2024

(54) AUTOMOBILE DOOR LATCH DEVICE

(71) Applicant: MITSUI KINZOKU ACT CORPORATION, Kanagawa (JP)

(72) Inventors: Shintaro Okawa, Kanagawa (JP); Hirotaka Nishijima, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 296 days.

(21) Appl. No.: 17/435,652

(22) PCT Filed: Jul. 26, 2019

(86) PCT No.: PCT/JP2019/029550
§ 371 (c)(1),
(2) Date: Sep. 1, 2021

(87) PCT Pub. No.: WO2020/179098
PCT Pub. Date: Sep. 10, 2020

(65) Prior Publication Data
US 2022/0145675 A1 May 12, 2022

(30) Foreign Application Priority Data
Mar. 4, 2019 (JP) .................................. 2019-038167

(51) Int. Cl.
*E05B 81/90* (2014.01)
*E05B 77/02* (2014.01)
(Continued)

(52) U.S. Cl.
CPC .............. *E05B 81/90* (2013.01); *E05B 77/02* (2013.01); *E05B 81/06* (2013.01); *E05B 83/36* (2013.01)

(58) Field of Classification Search
CPC .......... E05B 81/06; E05B 81/14; E05B 81/16; E05B 81/34; E05B 81/42; E05B 81/48;
(Continued)

(56) References Cited

U.S. PATENT DOCUMENTS 9,551,172 B2 * 1/2017 Barmscheidt ........... E05B 81/90
2017/0342749 A1 * 11/2017 Nelson ..................... E05B 79/10
(Continued)

FOREIGN PATENT DOCUMENTS

JP       2010-24802 A   2/2010
JP       6213927 B2    10/2017

OTHER PUBLICATIONS

International Search Report issued in corresponding International Patent Application No. 2019/029550 dated Oct. 15, 2019, w/English translation.

*Primary Examiner* — Christine M Mills
*Assistant Examiner* — Christopher F Callahan
(74) *Attorney, Agent, or Firm* — Rimon P.C.; Tomoki Tanida

(57) ABSTRACT

A latch device including: a latch mechanism configured to hold a door at a closing position; an electric releasing mechanism configured to release meshing of the latch mechanism; a manual releasing mechanism configured to release meshing of the latch mechanism; and a lock configured to switch between a locked state of the manual releasing mechanism and an unlocked state, wherein the electric releasing mechanism is configured to switch the lock from the locked state to the unlocked state by releasing meshing of the latch mechanism and switch the lock from the unlocked state to the locked state when a rotating cam returns to a reference position by a biasing force of a spring, when the lock is in the locked state and the rotating cam rotates by a predetermined angle in a first direction from the
(Continued)

reference position by power of a motor against a biasing force of the spring.

3 Claims, 12 Drawing Sheets

(51) Int. Cl.
    *E05B 81/06*     (2014.01)
    *E05B 83/36*     (2014.01)

(58) Field of Classification Search
    CPC .......... E05B 81/90; E05B 77/02; E05B 77/24;
            E05B 77/245; E05B 83/36; E05B 85/24;
                E05B 85/243; Y10T 292/1047; Y10T
                                       292/1082
    See application file for complete search history.

(56) References Cited

U.S. PATENT DOCUMENTS

2017/0350170 A1* 12/2017 Cetnar ................... E05B 77/26
2019/0271179 A1* 9/2019 Patane ................... E05B 81/36

* cited by examiner

FRONT ⟷ REAR

AUTOMOBILE DOOR LATCH DEVICE

CROSS-REFERENCE TO RELATED APPLICATIONS

This application is the U.S. National Phase under 35 U.S.C. § 371 of International Application No. PCT/JP2019/029550, filed on Jul. 26, 2019, which claims the benefit of Japanese Application No. 2019-038167, filed on Mar. 4, 2019, the entire contents of each are hereby incorporated by reference.

FIELD

The present invention relates to an automobile door latch device, and particularly relates to an automobile door latch device including an electric releasing mechanism, a manual releasing mechanism, and a locking mechanism.

BACKGROUND

Patent Literature 1 describes an automobile door latch device that includes: an electric releasing mechanism capable of releasing the meshing of a latch mechanism and a striker by power of a motor; a manual releasing mechanism capable of releasing the meshing of the latch mechanism by a manual operating force; and a locking mechanism capable of switching between a locked state in which a releasing operation by the manual releasing mechanism is disabled and an unlocked state in which the releasing operation by the manual releasing mechanism is enabled.

In the invention described in Patent Literature 1, the meshing of the latch mechanism is released exclusively by the electric releasing mechanism, and the manual releasing mechanism is provided to serve as a complement in the case where the electric releasing mechanism cannot perform an operation due to an electric system trouble or a battery voltage drop, for example. Accordingly, the locking mechanism is used only for the operation of the manual releasing mechanism and usually used in the locked state, and, only in an emergency, the locking mechanism is switched to the unlocked state.

Switching of the locking mechanism between the locked state and the unlocked state is performed by a normal rotation and a reverse rotation of a rotating cam (a cam body) that rotates by power of a motor. The rotating cam is held at a reference position by a biasing force of a neutral return spring, and is configured to switch the locking mechanism to the locked state when the rotating cam normally rotates from the reference position, and to the unlocked state when the rotating cam reversely rotates from the reference position.

Furthermore, when normally rotating from the reference position, the rotating cam releases the meshing of the latch mechanism. This allows a single motor to switch the locking mechanism and release the meshing of the latch mechanism.

CITATION LIST

Patent Literature

Patent Literature 1: Patent No. 6213927 (U.S. Pat. No. 9,551,172)

SUMMARY

Technical Problem

A problem of the invention described in Patent Literature 1 is that, in what is called a knob-less type device not having a locking and unlocking knob for manually switching a locking mechanism, it is not necessary to switch to an unlocked state by a manual operation using a key and switch to the unlocked state by power of a motor, unless an emergency occurs. Hence, the locking mechanism does not work in a normal operation and is maintained in a locked state for a long time. As a result, there is a possibility that grease is hardened due to aging degradation, or rust is formed on, for example, a spring or a lever made of a steel material, and this causes an operation failure, and, for example, a battery voltage drop of a battery hinders the locking mechanism from functioning in an emergency.

Furthermore, switching the locking mechanism from the unlocked state to the locked state is performed under a condition that the meshing of the latch mechanism is released, and therefore, without releasing the meshing of the latch mechanism, switching the locking mechanism from the unlocked state to the locked state cannot be solely performed with a single motor.

In view of the above-described problem, an object of the present invention is to provide an automobile door latch device in which a locking mechanism surely functions in an emergency, and an automobile door latch device in which releasing the meshing of a latch mechanism and switching a locking mechanism between a locked state and an unlocked state can each be solely performed with a single motor.

Solution to Problem

To solve the problem and achieve the object, an automobile door latch device according to the present invention includes: a latch mechanism configured to hold a door at a closing position by meshing with a striker; an electric releasing mechanism that is able to release meshing of the latch mechanism by power of a motor; a manual releasing mechanism that is able to release meshing of the latch mechanism by a manual operating force; and a locking mechanism that is able to switch between a locked state in which releasing meshing of the latch mechanism by an operation of the manual releasing mechanism is disabled and an unlocked state in which the releasing is enabled, wherein the electric releasing mechanism includes a rotating cam that is able to: rotate in a normal direction or a reverse direction from a reference position by power of the motor against a biasing force of a spring; and return to the reference position by a biasing force of the spring, and the electric releasing mechanism is configured to switch the locking mechanism from the locked state to the unlocked state by releasing meshing of the latch mechanism and switch the locking mechanism from the unlocked state to the locked state when the rotating cam returns to a reference position by a biasing force of the spring from a position to which the rotating cam has rotated by a predetermined angle, when the locking mechanism is in the locked state and the rotating cam rotates by the predetermined angle in the normal direction from the reference position by power of the motor against a biasing force of the spring.

Moreover, in the automobile door latch device according to the present invention, the electric releasing mechanism is configured to switch the locking mechanism from the locked state to the unlocked state and return the rotating cam to the reference position by a biasing force of the spring, when the locking mechanism is in the locked state and the rotating cam rotates in the reverse direction from the reference position by power of the motor against a biasing force of the spring.

Moreover, in the automobile door latch device according to the present invention, the locking mechanism includes an active lever configured not to regulate an angle of rotation of the rotating cam in the normal direction when the locking mechanism is in the locked state, and to regulate an angle of rotation of the rotating cam in the normal direction to a predetermined angle when the locking mechanism is in the unlocked state, and the electric releasing mechanism is configured to: release meshing of the latch mechanism and return the rotating cam to the reference position by a biasing force of the spring, when the locking mechanism is in the locked state and the rotating cam rotates by a larger angle than the predetermined angle in the normal direction from the reference position by power of the motor against a biasing force of the spring; switch the locking mechanism from the locked state to the unlocked state and return the rotating cam to the reference position by a biasing force of the spring, when the locking mechanism is in the locked state and the rotating cam rotates in the reverse direction from the reference position by power of the motor against a biasing force of the spring; and switch the locking mechanism from the unlocked state to the locked state and return the rotating cam to the reference position by a biasing force of the spring, when the locking mechanism is in the unlocked state and the rotating cam rotates by the predetermined angle in the normal direction from the reference position by power of the motor against a biasing force of the spring.

Advantageous Effects of Invention

According to the present invention, when the meshing of the latch mechanism is released by the electric releasing mechanism, a run-up operation is performed in which the locking mechanism is switched from the locked state to the unlocked state, and returned to the locked state again, and thus, the locking mechanism can be prevented from failing in functioning in an emergency.

In addition, releasing the meshing of the latch mechanism and switching the locking mechanism between the locked state and the unlocked state can each be solely performed with a single motor.

DESCRIPTION OF EMBODIMENTS

Hereinafter, an embodiment of the present invention will be described, based on the drawings.

Figure 1:
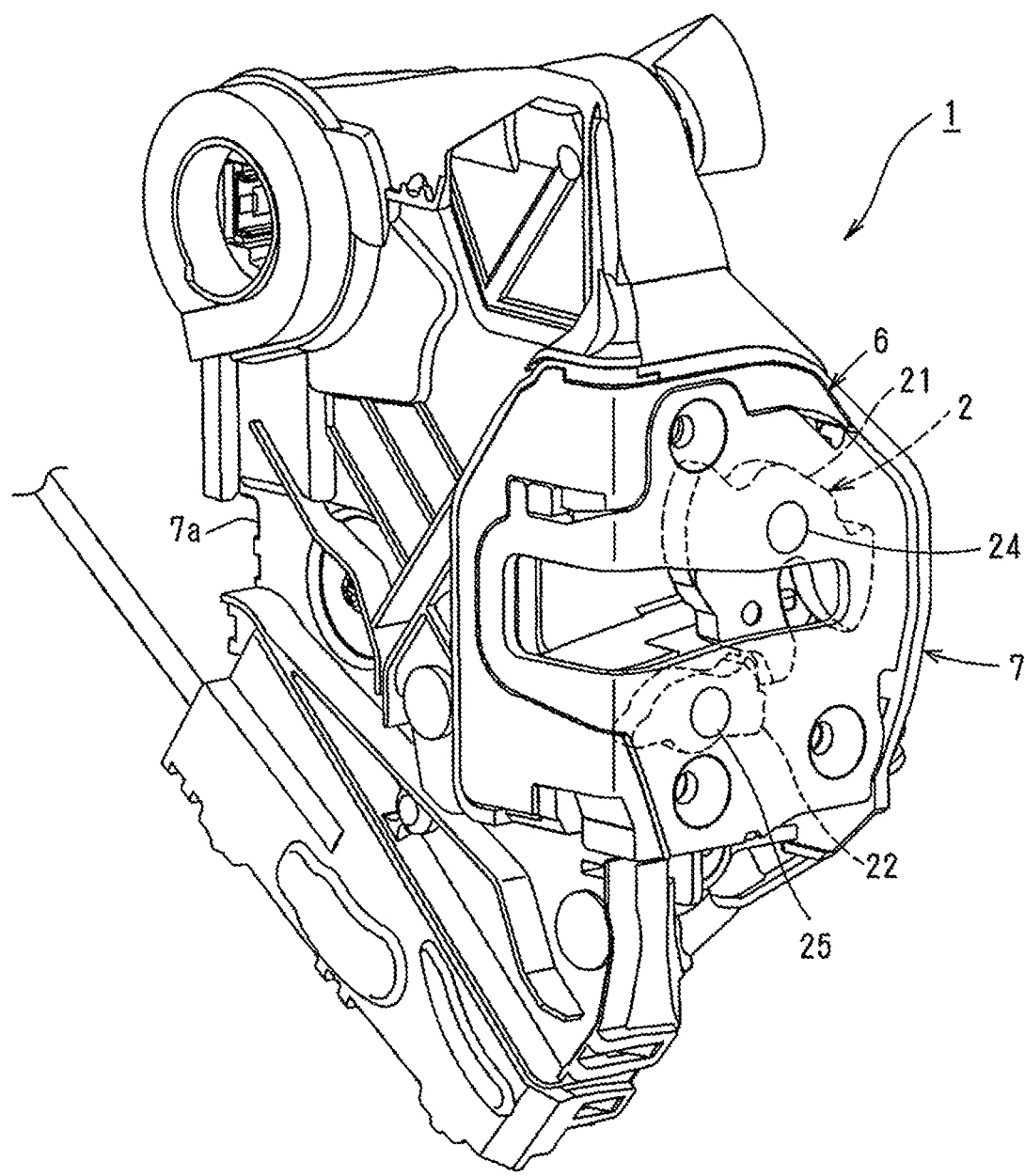
FIG. 1 is an external perspective view of an automobile door latch device according to the present invention.
Figure 2:
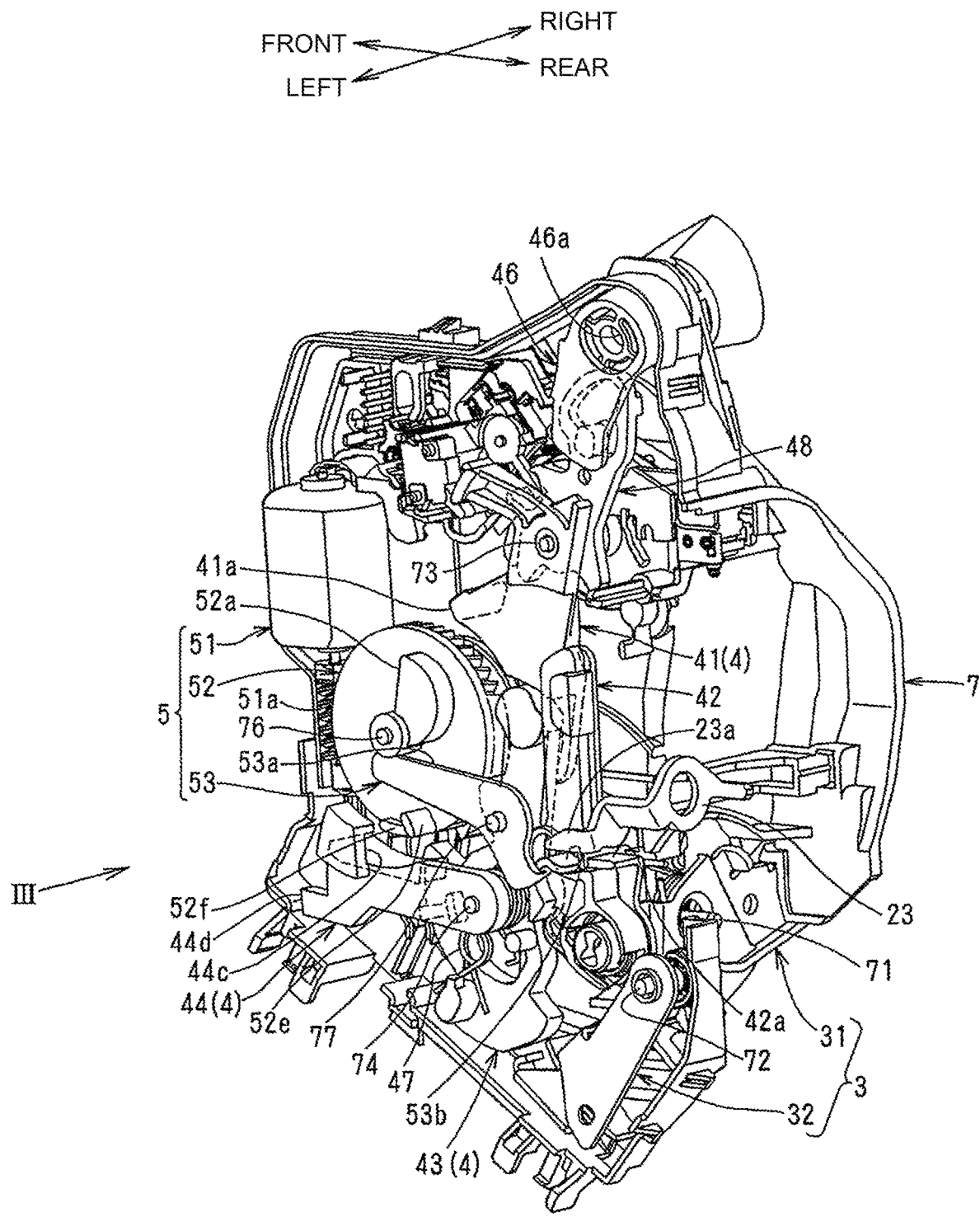
FIG. 2 is a perspective view of the automobile door latch device in which a latch mechanism and a cover are omitted.
Figure 3:
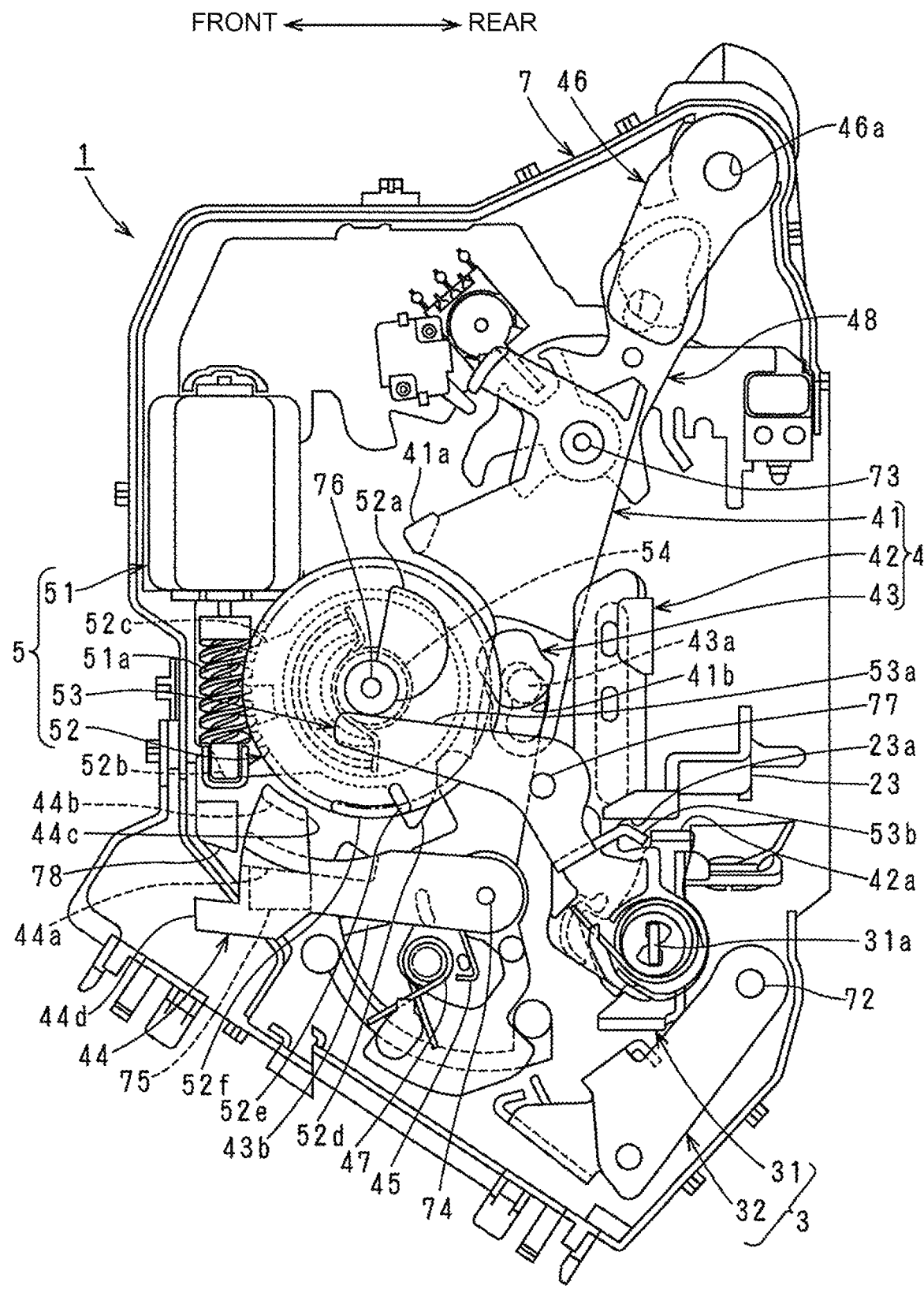
FIG. 3 is a diagram of the automobile door latch device viewed from an arrow III in FIG. 2.

As illustrated in FIG. 1 to FIG. 3, an automobile door latch device 1 includes: a latch mechanism 2 configured to hold a door at a closing position; a manual releasing mechanism 3 that is able to perform a releasing operation for releasing the meshing of the latch mechanism 2 by a manual operating force; a locking mechanism 4 that is able to switch between a locked state in which the releasing operation by the manual releasing mechanism 3 is disabled and an unlocked state in which the releasing operation by the manual releasing mechanism 3 is enabled; and an electric releasing mechanism 5 that is able to release the meshing of the latch mechanism 2 by electromotive power.

As illustrated in FIG. 1, the latch mechanism 2 includes: a latch 21 pivotally supported in a body 6 fixed inside a door by a latch shaft 24 and configured to mesh with a striker (not illustrated) on a vehicle body side upon closing the door; a ratchet 22 pivotally supported in the body 6 by a ratchet shaft 25 and configured to engage with the latch 21 meshing with the striker to prevent the latch 21 from rotating and to hold the door at the closing position; and a ratchet lever 23 (see FIG. 2 and FIG. 3) rotatable integrally with the ratchet 22.

The ratchet 22 rotates on a ratchet shaft 25 in a releasing direction, that is, a clockwise direction in FIG. 1, and thereby releasing the engagement with the latch 21 to make it possible to open the door. "Releasing the meshing" of "the latch mechanism 2" used in the following descriptions means that the engagement of the ratchet 22 and the latch 21 is released, whereby the door can be opened. Note that the ratchet 22 and the ratchet lever 23 are formed separately in the present embodiment, but are not limited to this configuration, and the ratchet 22 and the ratchet lever 23 may be integrally formed.

As illustrated in FIG. 2 and FIG. 3, the manual releasing mechanism 3 includes an outside lever 31 configured to work in an interlocked manner with a mechanical operation of an outside handle (not illustrated) provided on the vehicle outer side of a door, and an inside lever 32 configured to work in an interlocked manner with a mechanical operation of an inside handle (not illustrated) provided on the vehicle inner side of a door.

The outside lever 31 is pivotally supported in a housing 7 fixed to the body 6 by a pivot shaft 71 arranged in a front-rear direction and is configured to rotate on the pivot shaft 71 in a releasing direction (in a clockwise direction in FIG. 2) while interlocking with a mechanical operation of the outside handle. When the locking mechanism 4 is in the unlocked state, a rotary motion of the outside lever 31 is transmitted to the ratchet 22 via the ratchet lever 23 as described below. When the locking mechanism 4 is in the locked state, a rotary motion of the outside lever 31 is not transmitted to the ratchet 22 as described below.

The inside lever 32 is pivotally supported in the housing 7 by a pivot shaft 72 arranged in a right-left direction and is configured to rotate on the pivot shaft 72 in a clockwise direction in FIG. 3 while interlocking with a mechanical operation of the inside handle. A rotary motion of the inside lever 32 is directly transmitted to the outside lever 31. Accordingly, when the locking mechanism 4 is in the unlocked state, a rotary motion of the inside handle is transmitted to the ratchet 22, and in contrast, when the locking mechanism 4 is in the locked state, a rotary motion of the inside handle is not transmitted to the ratchet 22. Note that a left side face of the housing 7, the face facing the inside of a vehicle, is closed by a cover 7a as illustrated in FIG. 1.

The locking mechanism 4 includes a locking lever 41 pivotally supported in the housing 7 by a pivot shaft 73, a sub-lever 42 coupled to the locking lever 41, a first active lever 43 pivotally supported in the housing 7 by a pivot shaft 74, and a second active lever 44 pivotally supported on the same pivot shaft as the first active lever 43.

The locking lever 41 is rotatable in the front-rear direction on the pivot shaft 73, and, for example, rotatable through a predetermined angle in a counterclockwise direction from an unlocked position to a locked position illustrated in FIG. 3, and in a direction reverse to the counterclockwise direction by a rotation of a rotating cam 52 by power of a later-described motor 51, and by a manual operating force of a key cylinder provided on the vehicle outer side of the door by using a key. When the locking lever 41 is arranged in the unlocked position, the locking mechanism 4 is in the unlocked state. In contrast, when the locking lever 41 is arranged in the locked position, the locking mechanism 4 is in the locked state. An input part 41a protruding rightward in a bar manner to face the outer side of the vehicle is provided in an upper portion of the locking lever 41. A first acting part 52b and a second acting part 52c of the rotating cam 52, which will be later described, act on the input part 41a.

A key lever 46 pivotally supported in the housing 7 and configured to rotate on a rotating part 46a while being interlocked with a rotation of a key cylinder by using a key is coupled to an upper end of the locking lever 41. The key lever 46 is coupled to the locking lever 41 via a sub-key-lever 48 pivotally supported below the key lever 46. Thus, even in an emergency in which the meshing of the latch mechanism 2 cannot be released by power of the motor 51 due to a battery voltage drop, for example, the locking mechanism 4 can be switched from the locked state to the unlocked state and from the unlocked state to the locked state by a manual operating force by using a key.

Note that, in the present embodiment, when the locking mechanism 4 is in the locked state, the opening of a door is made possible by power of the motor 51, and hence, basically an operation of the locking mechanism 4 by using a key is not performed unless an emergency occurs.

An upper portion of the sub-lever 42 is rotatably coupled to a lower portion of the locking lever 41 and slidably coupled in a vertical direction. A lower end of the sub-lever 42 is coupled to a coupling part 31a, that is, an end of the outside lever 31 so as to be rotatable through a predetermined angle in the front-rear direction. Thus, when the locking lever 41 rotates from the unlocked position to the locked position or from the locked position to the unlocked position, the sub-lever 42 is interlocked with this rotation and thereby rotates on the coupling part 31a serving as a rotation center through a predetermined angle in the counterclockwise direction from an unlocked position illustrated in FIG. 3 to a locked position, or from the locked position to the unlocked position.

In the case where the locking lever 41 and the sub-lever 42 are each at the unlocked position, when the outside lever 31 rotates based on a mechanical operation of the outside handle or the inside handle, the sub-lever 42 moves straight upward from the unlocked position illustrated in FIG. 3, so that a releasing part 42a provided in the sub-lever 42 comes into contact with an arm 23a of the ratchet lever 23 from below. Thus, the ratchet lever 23 and the ratchet 22 rotate in a releasing direction to release the meshing of the latch mechanism 2. In the case where the locking lever 41 and the sub-lever 42 are at their respective locked positions, even when the outside lever 31 rotates based on a mechanical operation of the outside handle or the inside handle, the sub-lever 42 is guided diagonally forward and upward by the locking lever 41, and accordingly, the releasing part 42a of the sub-lever 42 does not come into contact with the arm 23a of the ratchet lever 23. Thus, the ratchet lever 23 and the ratchet 22 do not rotate in the releasing direction, and therefore, the door cannot be opened by a mechanical operation of the outside handle or the inside handle.

Figure 4:
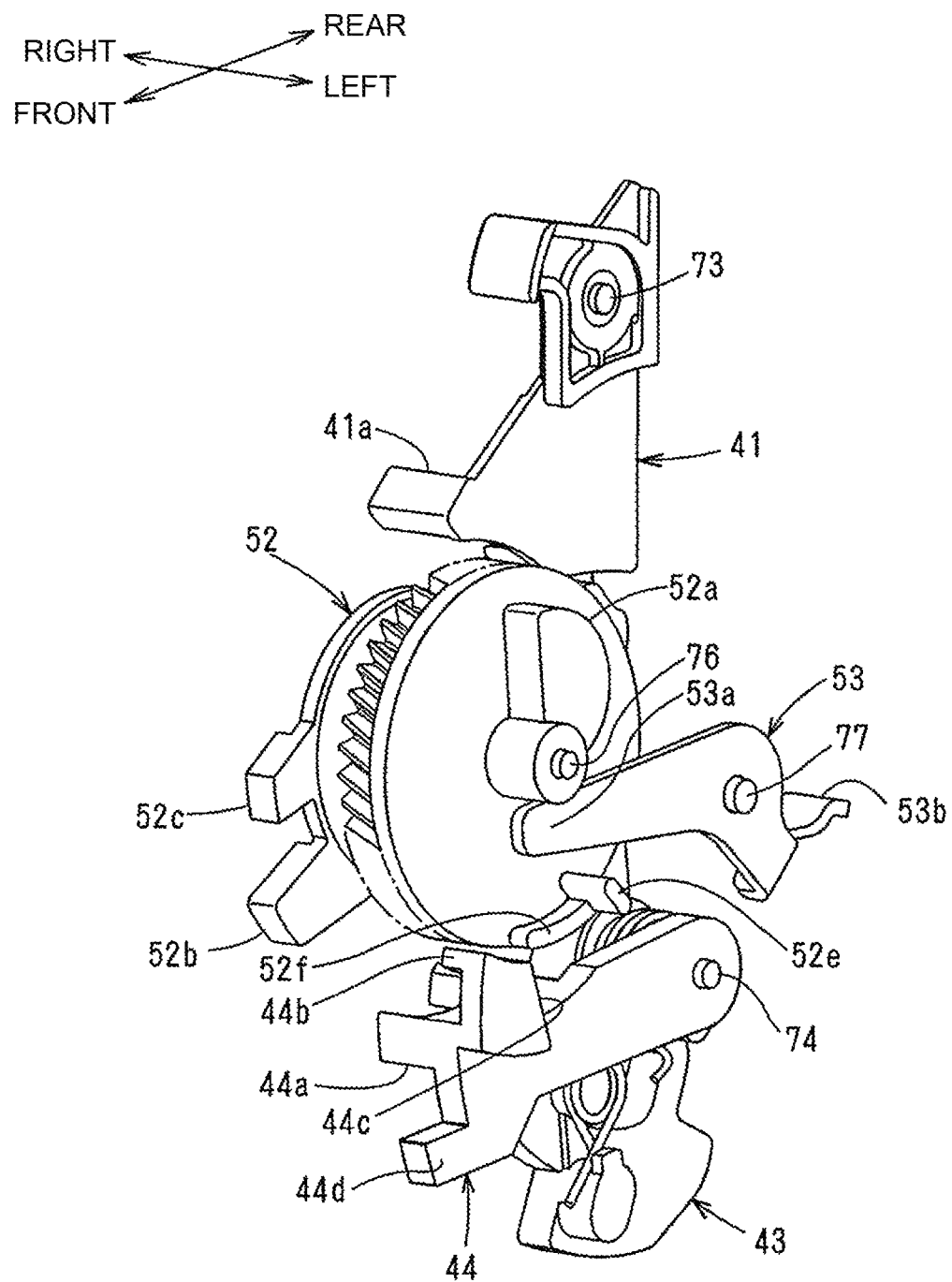
FIG. 4 is a perspective view of a main part.
Figure 5:
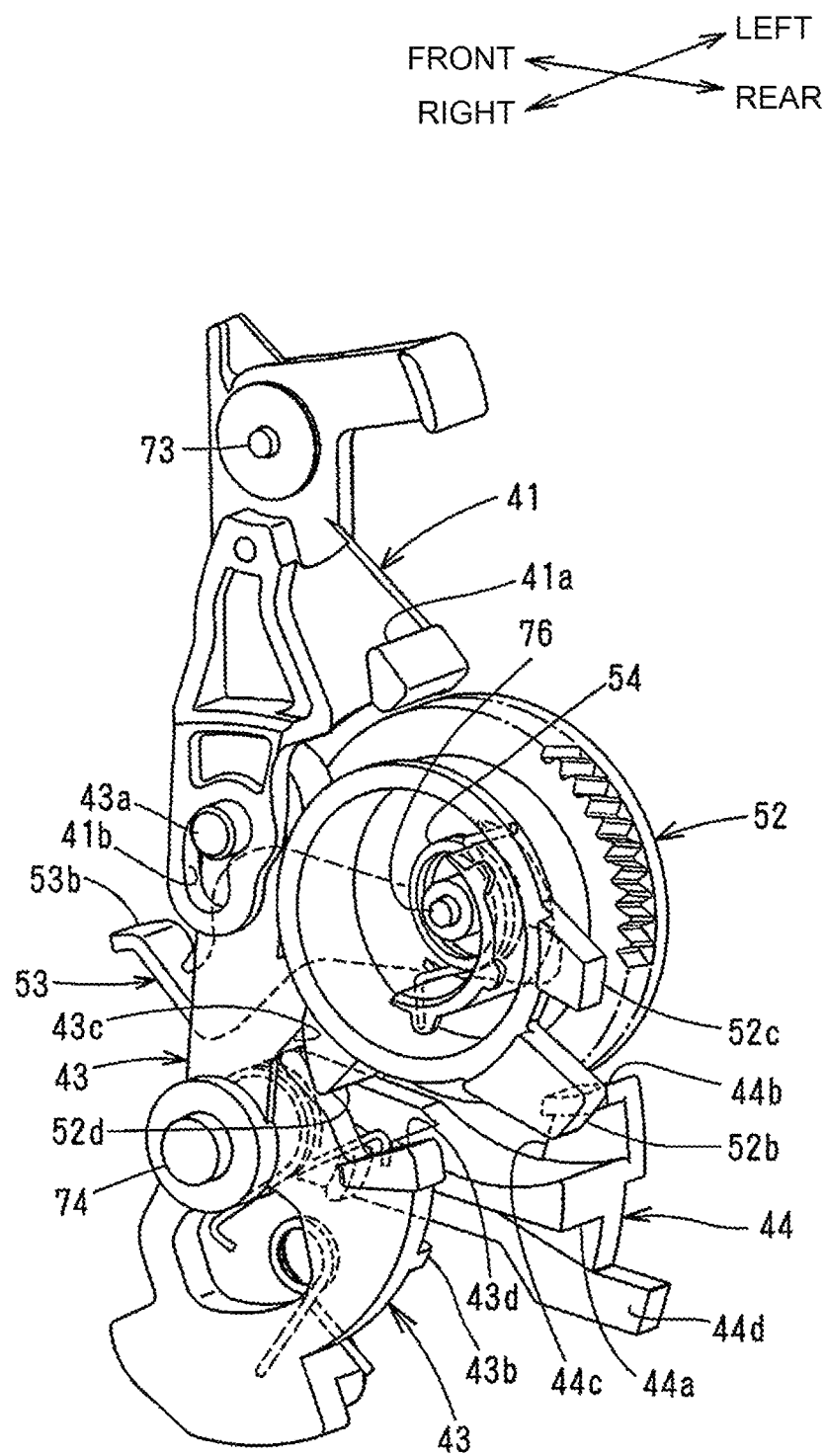
FIG. 5 is a perspective view of the main part seen from a direction different from a direction in FIG. 4.

FIG. 4 is a perspective view of a main part; FIG. 5 is a perspective view of the main part seen from a direction different from the direction in FIG. 4; and FIG. 6 to FIG. 12 are front views for describing operations of the main part.

Figure 11:
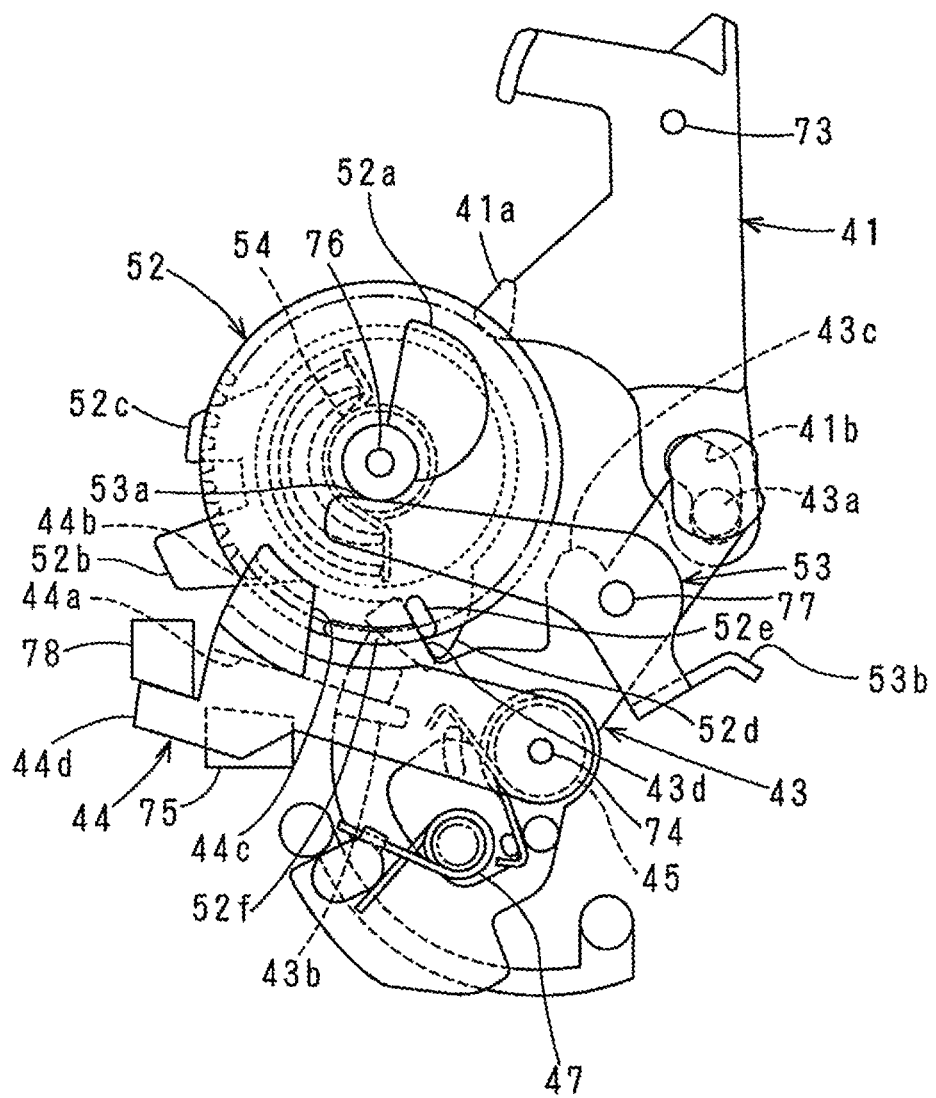
FIG. 11 is a front view of the main part when the rotating cam rotates from a position in FIG. 10 and returns to the reference position.

An approximately center portion of the first active lever 43 arranged in the vertical direction is pivotally supported in the housing 7 by the pivot shaft 74, and also a coupling shaft 43a provided in an upper end of the first active lever 43 is rotatably and vertically movably coupled to a long hole 41b provided in the vertical direction in a lower portion of the locking lever 41. Thus, the first active lever 43 rotates while following a rotation of the locking lever 41, and, when the locking lever 41 is at the locked position, the first active lever 43 is elastically held at a locked position illustrated in FIG. 6. When the locking lever 41 is at the unlocked position, as illustrated in FIG. 11, the first active lever 43 rotates through a predetermined angle from the locked position in the clockwise direction to be elastically held at an unlocked position. The first active lever 43 is elastically held at the locked position or the unlocked position by an elastic force of a spring 47 configured to act on the first active lever 43. A holding force of the spring 47 to elastically hold the first active lever 43 at each of the positions is transmitted also to the locking lever 41.

A rear end of the second active lever 44 is pivotally supported in the housing 7 by the pivot shaft 74, and also biased in the counterclockwise direction by a spring 45. When the locking lever 41 and the first active lever 43 are at their respective locked positions, a first protrusion 44a provided on the back side of the second active lever 44 comes into contact with a first stopper 75 provided in the housing 7, at a locked position from the counterclockwise direction.

When the first active lever 43 rotates from the locked position to the unlocked position, a protrusion 43b provided in the first active lever 43 comes into contact with the first protrusion 44a of the second active lever 44 from the clockwise direction. Thus, the second active lever 44 rotates in the clockwise direction from a locked position through a predetermined angle against a biasing force of the spring 45, and shifts to, for example, an unlocked position illustrated in FIG. 11. An end 44d of the second active lever 44 having moved to the unlocked position comes into contact with a second stopper 78 provided in the housing 7.

At an upper front end of the second active lever 44, a second protrusion 44b and a stopper 44c each interacting with the rotating cam 52 of the electric releasing mechanism 5 are provided. When the second active lever 44 is at the locked position, the second protrusion 44b is positioned apart from a rotation orbit of the rotating cam 52. When the second active lever 44 rotates to the unlocked position, the second protrusion 44b enters the rotation orbit of the rotating cam 52. Thus, when the second active lever 44 is in the locked position, an angle of rotation of the rotating cam 52 from the reference position in the clockwise direction (the normal direction) is not regulated, and when the second active lever 44 is in the unlocked position, the angle of rotation of the rotating cam 52 from the reference position in the clockwise direction is regulated to a predetermined angle.

Figure 6:
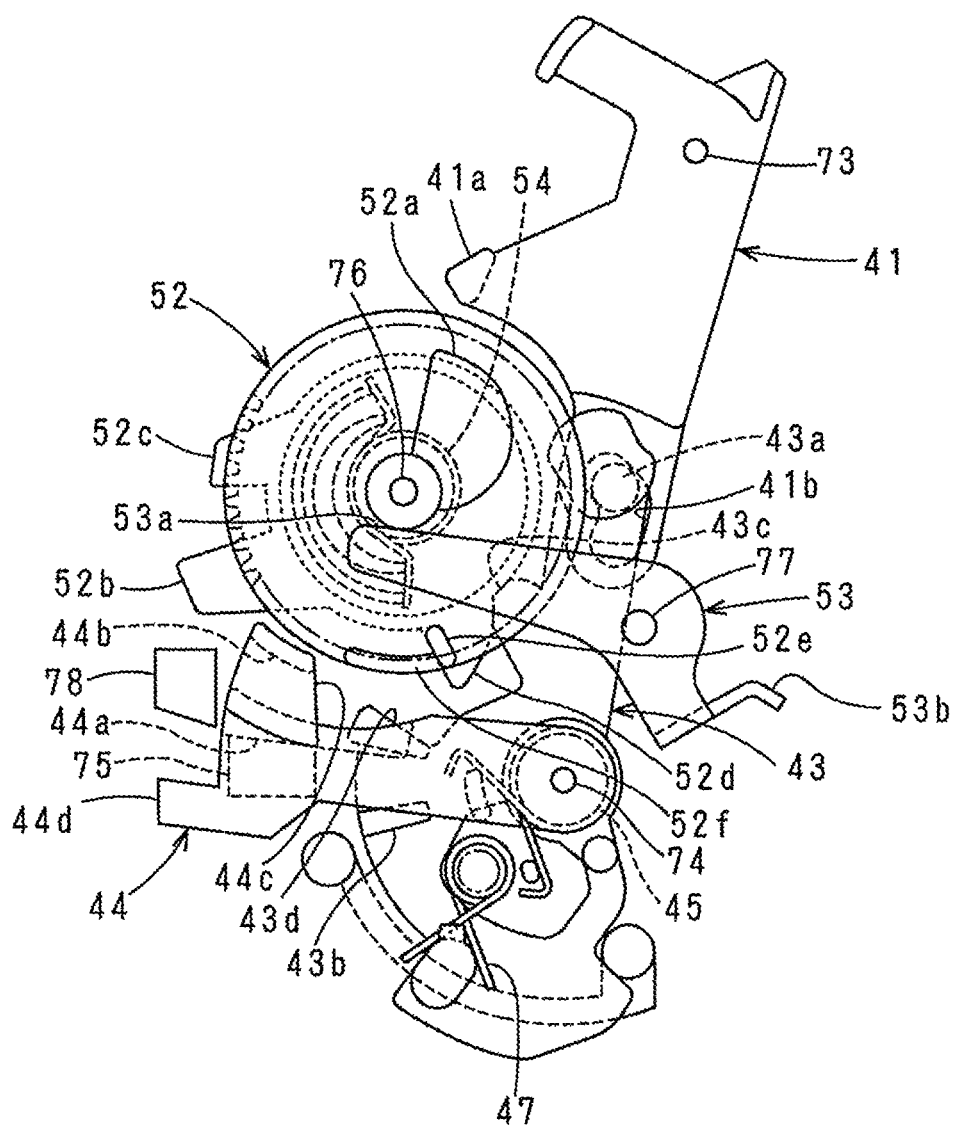
FIG. 6 is a front view of the main part in the case where a rotating cam is at a reference position.

As illustrated in FIG. 2 and FIG. 3, the electric releasing mechanism 5 includes: a motor 51 supported in the housing 7; the rotating cam 52 including a worm wheel rotatable on a pivot shaft 76 in the normal and reverse directions, based on power of the motor 51, by meshing with a worm gear 51a rotating integrally with a rotating shaft of the motor 51; and an opening lever 53 rotatable on a pivot shaft 77 in the counterclockwise direction by a rotation of the rotating cam 52 in the clockwise direction (normal direction) from the reference position illustrated in FIG. 6.

When a sensor (not illustrated) detects an initial motion among mechanical operations of the outside handle, or when a locking operation of a user's mobile wireless operation switch and transmitter is performed, the motor 51 is driven in the normal direction of rotation. When an unlocking operation of the wireless operation switch and transmitter is performed, the motor 51 is driven in the reverse direction of rotation. Note that the detection of the sensor is effective only when an authentication device installed in an automobile has authenticated the wireless operation switch and transmitter.

The rotating cam 52 is pivotally supported in the housing 7 by the pivot shaft 76 extending in the right-left direction, and is usually elastically held at, for example, a reference position illustrated in FIG. 6 (the reference position) by a biasing force of a spring 54 provided on the back side of the rotating cam 52. The rotating cam 52 rotates from a reference position in the clockwise direction (normal direction) against a biasing force of the spring 54 by a normal rotation of the motor 51. The rotating cam 52 rotates from the reference position in the counterclockwise direction (reverse direction) against a biasing force of the spring 54 by a reverse rotation of the motor 51. After the rotation in the clockwise direction or the counterclockwise direction, when electric supply to the motor 51 is stopped, the rotating cam 52 rotates by a biasing force of the spring 54, and returns to the reference position.

The rotating cam 52 includes a cam 52a configured to act on the opening lever 53, a first acting part 52b and a second acting part 52c each configured to act on the locking lever 41 of the locking mechanism 4, a third acting part 52d configured to act on the first active lever 43 of the locking mechanism 4, and a fourth acting part 52e and a fifth acting part 52f each configured to interact with the second active lever 44.

The opening lever 53 is pivotally supported in the housing 7 by the pivot shaft 77 arranged in the right-left direction, and includes a first arm 53a extending forward to overlap with a rotation face of the rotating cam 52, and a second arm 53b extending diagonally backward and downward and configured to act on the ratchet lever 23.

The cam 52a of the rotating cam 52 has a semicircle shape protruding leftward on a rotation surface on the front side of the rotating cam 52, and, when the rotating cam 52 rotates from the reference position in the clockwise direction against the biasing force of the spring 54, an arc-shaped surface of the cam 52a comes into contact with the first arm 53a of the opening lever 53 from above, and thereby presses down the first arm 53a and acts to cause the opening lever 53 to rotate from the reference position in the counterclockwise direction.

When the opening lever 53 rotates from the reference position in the counterclockwise direction, the second arm 53b comes into contact with the arm 23a of the ratchet lever 23 from below, so that, regardless of a state of the locking mechanism 4, the opening lever 53 rotates the ratchet 22 in the releasing direction to release the meshing of the latch mechanism 2 and thereby make a door opening operation possible (a releasing operation of the opening lever 53).

The first acting part 52b of the rotating cam 52 is provided so as to be positioned slightly apart from the second acting part 52c in the counterclockwise direction and protrude outward longer from the outer periphery of the rotating cam 52 than the second acting part 52c.

When the rotating cam 52 rotates from the reference position in the clockwise direction against the biasing force of the spring 54, the first acting part 52b comes into contact from ahead with the input part 41a of the locking lever 41 at the locked position, so that the rotating cam 52 acts on the locking lever 41 to shift the locking lever 41 from the locked position to the unlocked position. In this case, on or immediately after shifting the locking lever 41 to the unlocked position, the rotating cam 52 is regulated in rotation in the clockwise direction and stops at a release position illustrated in FIG. 8, and electric supply to the motor 51 is stopped, so that the rotating cam 52 rotates from the release position in the counterclockwise direction by a biasing force of the spring 54, and returns to the reference position.

When the rotating cam 52 returns from the release position to the reference position by the biasing force of the spring 54, the second acting part 52c comes into contact with the input part 41a of the locking lever 41 at the unlocked position from the counterclockwise direction, so that the rotating cam 52 acts on the locking lever 41 to shift the locking lever 41 from the unlocked position to the locked position.

When the rotating cam 52 is at the reference position and the first active lever 43 is at the locked position, the third acting part 52d faces a first engaging part 43c of the first active lever 43 as illustrated in FIG. 6. When the rotating cam 52 is at the reference position and the first active lever 43 is at the unlocked position, the third acting part 52d faces a second engaging part 43d of the first active lever 43 as illustrated in FIG. 11.

When the first active lever 43 is at the locked position and the rotating cam 52 rotates through a predetermined angle from the reference position in the counterclockwise direction by power of the motor 51, the third acting part 52d comes into contact with the first engaging part 43c of the first active lever 43, so that the first active lever 43 is shifted from the locked position to the unlocked position. When the first active lever 43 is at the unlocked position and the rotating cam 52 rotates from the reference position in the clockwise direction by power of the motor 51, the third acting part 52d comes into contact with the second engaging part 43d of the first active lever 43, so that the first active lever 43 is shifted from the unlocked position to the locked position.

Note that, when the locking mechanism 4 is in the unlocked state, an angle of rotation of the rotating cam 52 from the reference position in the clockwise direction is regulated by the second active lever 44 so as to be smaller than in a case in which the locking mechanism 4 is in the locked state, as described below, and hence, the releasing operation of the opening lever 53 is not performed with the rotation of the rotating cam 52 in the clockwise direction.

In the case where the second active lever 44 is at the unlocked position, the fourth acting part 52e of the rotating cam 52 comes into contact with the stopper 44c of the second active lever 44 at the time when the rotating cam 52 rotates through a predetermined angle from the reference position in the clockwise direction against a biasing force of the spring 54 by power of the motor 51, whereby the angle of rotation of the rotating cam 52 in the clockwise direction is regulated so as to be smaller than in the case in which the locking mechanism 4 is in the locked state.

In the case where the locking mechanism 4 is in the unlocked state and the second active lever 44 is in the unlocked position, when the rotating cam 52 rotates from the reference position in the clockwise direction by power of the motor 51, the fifth acting part 52f changes its own position so as to be engageable with the second protrusion 44b of the second active lever 44, before the fourth acting part 52e comes into contact with the stopper 44c of the second active lever 44 and the third acting part 52d comes into contact with the second engaging part 43d of the first active lever 43, so that the fifth acting part 52f prevents the second active lever 44 from rotating in the counterclockwise direction, that is, from rotating toward the locked position. Thus, the second active lever 44 is held at the unlocked position, until all the constituents of the locking mechanism 4 except the second active lever 44 shift to their respective locked positions, and the angle of rotation of the rotating cam 52 from the reference position in the counterclockwise direction is surely regulated to be a predetermined angle.

Next, a description will be given of an action of the automobile door latch device 1.

<Case where Locking Mechanism 4 is in Locked State and Rotating Cam 52 Rotates from Reference Position in Clockwise Direction>

Figure 7:
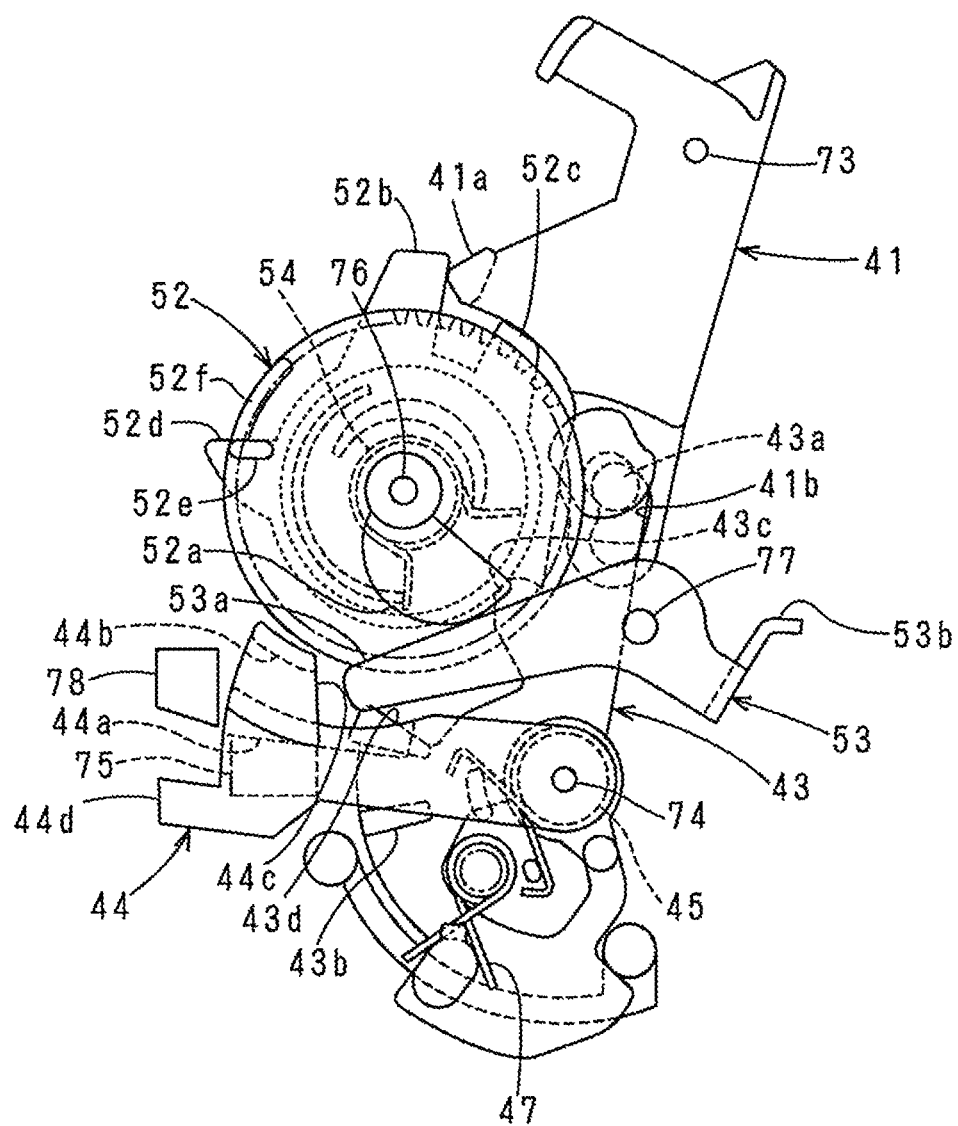
FIG. 7 is a front view of the main part when the rotating cam rotates in a normal direction from the reference position.
Figure 8:
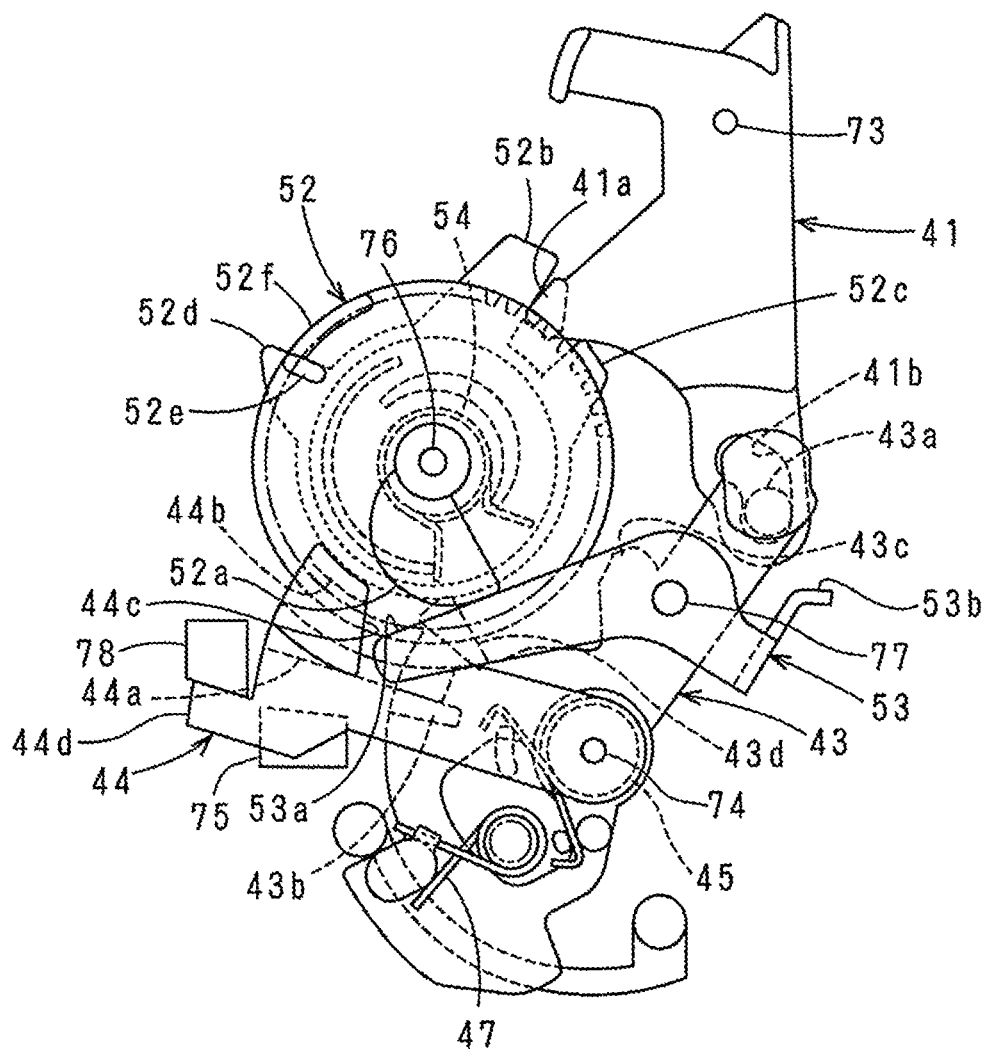
FIG. 8 is a front view of the main part when the rotating cam further rotates in the normal direction from a position illustrated in FIG. 7.
Figure 9:
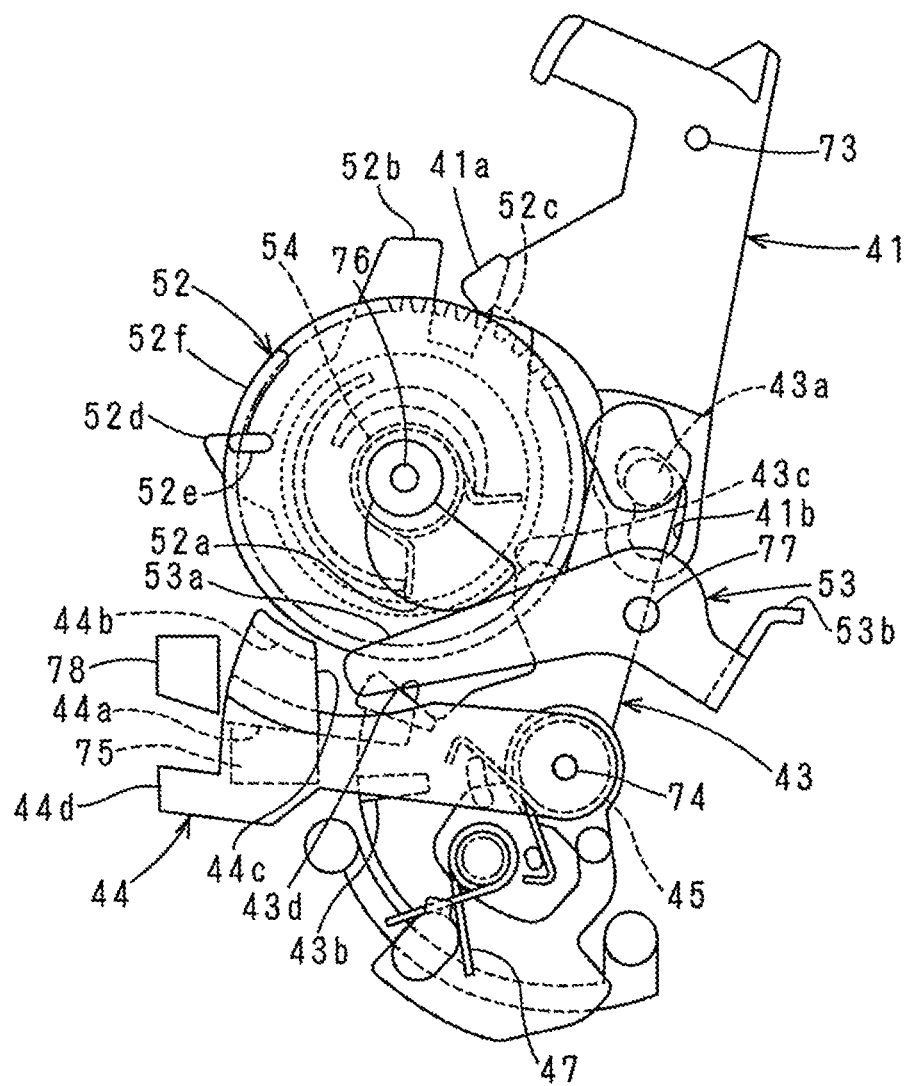
FIG. 9 is a front view of the main part when the rotating cam rotates from a position illustrated in FIG. 8 and returns to the reference position.

FIG. 6 illustrates a state in which the locking mechanism 4 is in the locked state and the rotating cam 52 is in a reference position. FIG. 7 illustrates a state in which the rotating cam 52 is in the middle of rotating from the reference position in the clockwise direction by power of the motor 51. FIG. 8 illustrates a state in which the rotating cam 52 has rotated from the reference position in the clockwise direction and stopped at a release position. FIG. 9 illustrates a state in which the rotating cam 52 is in the middle of returning from the release position to the reference position.

When the rotating cam 52 rotates in the clockwise direction from the reference position illustrated in FIG. 6, an arc-shaped surface of the cam 52a comes into contact with the first arm 53a of the opening lever 53 from above with the rotation of the rotating cam 52, so that the opening lever 53 is rotated in the counterclockwise direction, that is, a releasing direction. Then, as illustrated in FIG. 7, when the rotating cam 52 rotates in the clockwise direction from the reference position through approximately 120 degrees, the opening lever 53 rotates to a final position in the releasing direction, and releases the meshing of the latch mechanism 2 via the ratchet lever 23 to make the opening of a door possible.

When the rotating cam 52 further rotates in the clockwise direction from a position illustrated in FIG. 7, the first acting part 52b comes into contact with the input part 41a of the locking lever 41, so that, as illustrated in FIG. 8, the locking lever 41 is rotated from the locked position to the unlocked position and the rotating cam 52 stops at the release position. In this case, with the rotation of the locking lever 41 from the locked position to the unlocked position, the first active lever 43 and the second active lever 44 also rotate from their respective locked positions to their respective unlocked positions, but, the rotations of the first active lever 43 and the second active lever 44 do not affect other constituents.

In the present embodiment, when the rotating cam 52 rotates from the reference position in the clockwise direction, the meshing of the latch mechanism 2 is released first, and subsequently the locking mechanism 4 is switched from the locked state to the unlocked state. However, instead, the releasing of the meshing of the latch mechanism 2 and the switching of the locking mechanism 4 from the locked state to the unlocked state may be simultaneously performed, or alternatively, the switching of the locking mechanism 4 from the locked state to the unlocked state may be performed prior to the releasing of the meshing of the latch mechanism 2.

When the rotating cam 52 stops at the release position illustrated in FIG. 8, electric supply to the motor 51 is stopped. Thus, the rotating cam 52 rotates from the release position toward the reference position in the counterclockwise direction by a biasing force of the spring 54. Then, as illustrated in FIG. 9, when the rotating cam 52 slightly rotates from the release position toward the reference position, the second acting part 52c of the rotating cam 52 comes into contact with the input part 41a of the locking lever 41 from the counterclockwise direction, so that the locking lever 41 is rotated to the locked position again. Subsequently, the rotating cam 52 further rotates in the counterclockwise direction by a biasing force of the spring 54, and returns to the reference position illustrated in FIG. 6 and stops.

To sum up the above-described operations, in the case where the locking mechanism 4 is in the locked state and the rotating cam 52 rotates from the reference position in the clockwise direction by power of the motor 51, the rotation of the rotating cam 52 from the reference position in the clockwise direction allows the opening lever 53 to perform the release operation to make a door opening operation possible, and, at the same time, allows the locking mechanism 4 in the locked state to be once switched to the unlocked state. Then, with the return of the rotating cam 52 to the reference position by a biasing force of the spring 54, the locking mechanism 4 having been switched to the unlocked state is switched to the locked state again.

As described above, when a door is opened by power of the motor 51, the locking mechanism 4, which is not usually used, is switched. Thus, hardening of a grease or generation of rust on a movable portion of the locking mechanism 4 due to disuse of the locking mechanism 4 for a long time can be prevented. Thus, in an emergency, the locking mechanism 4 can be surely switched from a locked position to an unlocked position or from the unlocked position to the locked position.

<Case where Locking Mechanism 4 is in Locked State and Rotating Cam 52 Rotates from Reference Position in Counterclockwise Direction>

Figure 10:
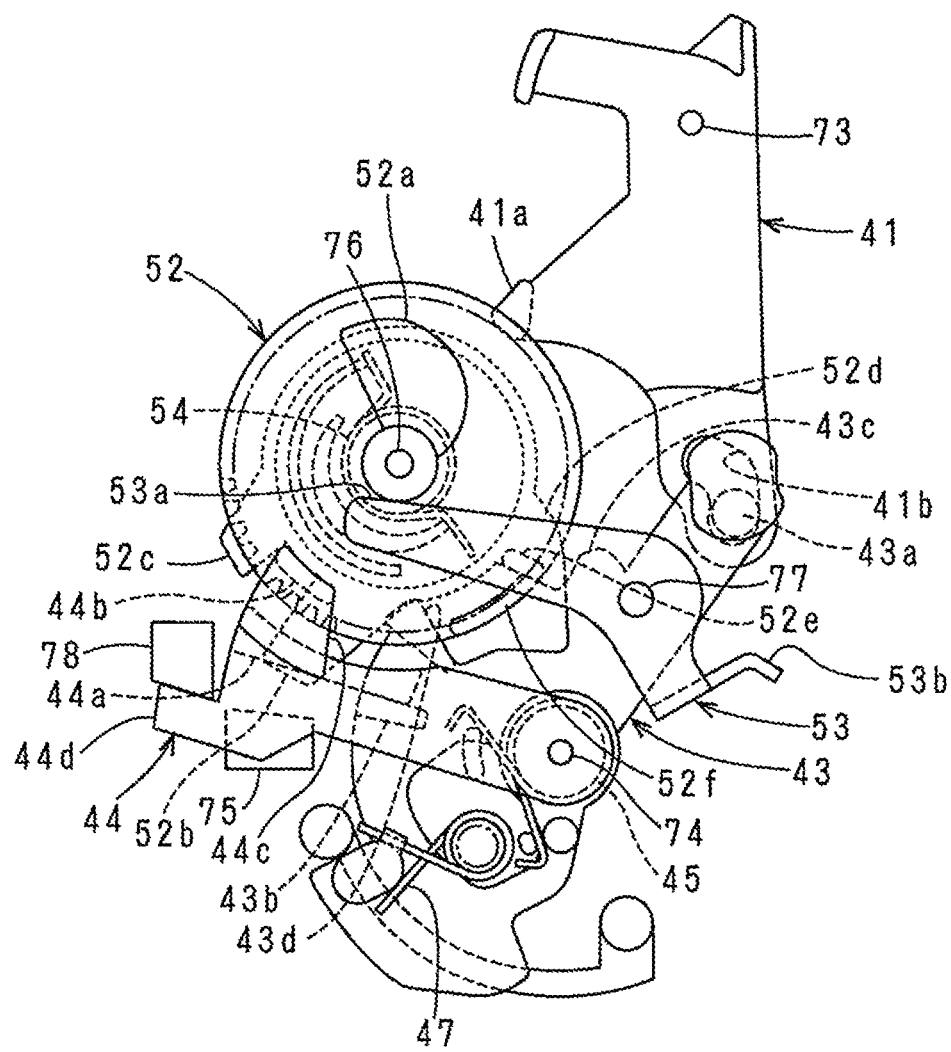
FIG. 10 is a front view of the main part when the rotating cam rotates in a reverse direction from the reference position.

When the rotating cam 52 in a state illustrated in FIG. 6 rotates from the reference position in the counterclockwise direction by power of the motor 51, the third acting part 52d engages with the first engaging part 43c of the first active lever 43 as illustrated in FIG. 10, so that the first active lever 43 is rotated from the locked position to the unlocked position. Then, when electric supply to the motor 51 is stopped after the first active lever 43 is rotated to the unlocked position, the rotating cam 52 is rotated in the clockwise direction by a biasing force of the spring 54 from a position at which the first active lever 43 is rotated to the unlocked position, and returns to the reference position as illustrated in FIG. 11.

As described above, in the case where the rotating cam 52 is rotated from the reference position in the counterclockwise direction by power of the motor 51 while the locking mechanism 4 is in the locked state, the locking mechanism 4 can be independently switched from the locked state to the unlocked state.

<Case where Locking Mechanism 4 is in Unlocked State and Rotating Cam 52 Rotates from Reference Position in Clockwise Direction>

Figure 12:
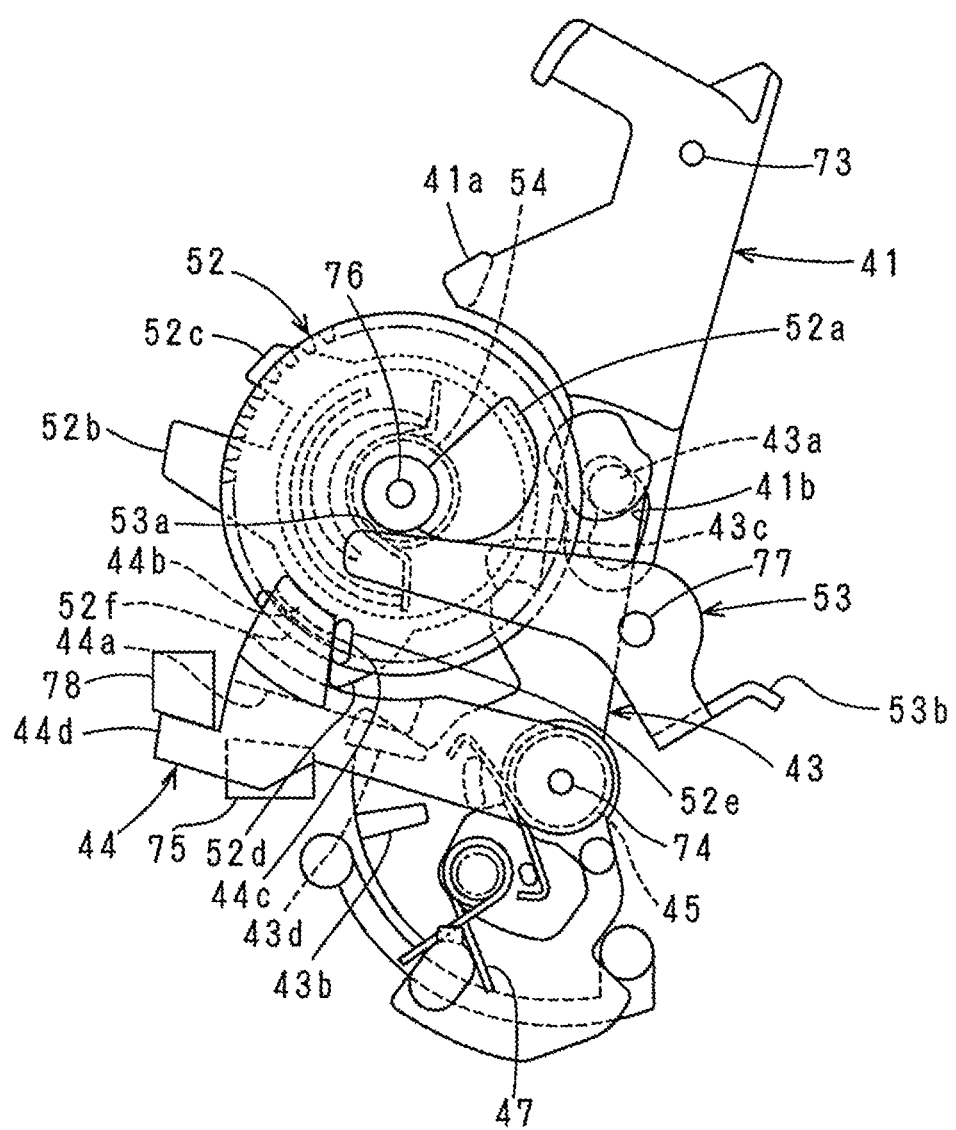
FIG. 12 is a front view of the main part when the rotating cam rotates in the normal direction from the reference position while the locking mechanism is in the unlocked state.

When the rotating cam 52 in a state illustrated in FIG. 11 rotates from the reference position in the clockwise direction, the fifth acting part 52f immediately slips into the back side of the stopper 44c of the second active lever 44 to prevent the second active lever 44 from rotating from the unlocked position to the locked position. In this state, when the rotating cam 52 further rotates in the clockwise direction, the third acting part 52d comes into contact with the second engaging part 43d of the first active lever 43 as illustrated in FIG. 12, so that the first active lever 43 is rotated from the unlocked position to the locked position. Immediately after this rotation (a position after the rotating cam 52 rotates at approximately 30 degrees from the reference position in the clockwise direction), the fourth acting part 52e comes into contact with the stopper 44c of the second active lever 44 from the clockwise direction, so that the rotating cam 52 stops in a position of the contact.

Thus, in the case where the locking mechanism 4 is in the unlocked state, an angle of rotation of the rotating cam 52 from the reference position in the clockwise direction is regulated so as to be smaller than an angle of rotation for releasing the meshing of the latch mechanism 2 by the releasing operation of the opening lever 53 while the locking mechanism 4 is in the locked state.

Then, when the rotating cam 52 stops rotation in the clockwise direction, electric supply to the motor 51 is stopped. Thus, the rotating cam 52 rotates in the counterclockwise direction from the stop position by a biasing force of the spring 54, and returns to the reference position.

When the rotating cam 52 returns to the reference position, the engagement relation between the fifth acting part 52f of the rotating cam 52 and the second protrusion 44b of the second active lever 44 is canceled. Thus, the first active lever 43 has already switched to the locked position, and accordingly, the second active lever 44 returns to the locked position by a biasing force of the spring 45 and enters a state illustrated in FIG. 6.

As described above, in the case where the rotating cam 52 is rotated from the reference position in the clockwise direction by power of the motor 51 while the locking mechanism 4 is in the unlocked state, the locking mechanism 4 can be independently switched from the unlocked state to the locked state.

REFERENCE SIGNS LIST 1 automobile door latch device
2 latch mechanism
21 latch
22 ratchet
23 ratchet lever
23a arm
24 latch shaft
25 ratchet shaft
3 manual releasing mechanism
31 outside lever
31a coupling part
32 inside lever
4 locking mechanism
41 locking lever
41a input part
41b long hole
42 sub-lever
42a releasing part
43 first active lever
43a coupling shaft
43b protrusion
43c first engaging part
43d second engaging part
44 second active lever
44a first protrusion
44b second protrusion
44c stopper
44d end
45 spring
46 key lever
46a rotating part
47 spring
48 sub-key-lever
5 electric releasing mechanism
51 motor
51a worm gear
52 rotating cam
52a cam
52b first acting part
52c second acting part
52d third acting part
52e fourth acting part
52f fifth acting part
53 opening lever
53a first arm
53b second arm
54 spring
6 body
7 housing
7a cover
71, 72, 73, 74 pivot shaft
75 first stopper
76, 77 pivot shaft
78 second stopper

The invention claimed is:

1. An automobile door latch device, comprising:
a latch mechanism including a latch and a ratchet, the latch mechanism being configured to hold a door at a closing position by meshing the latch with a striker;
an electric releasing mechanism including a motor and a rotating cam configured to rotate in a first direction or a second direction that is a reverse direction from the first direction, from a reference position by power of the motor against a biasing force of a spring and return to the reference position by the biasing force of the spring, the electric releasing mechanism being configured to release meshing of the latch mechanism by power of the motor;
a manual releasing mechanism including an outside lever and an inside lever, the manual releasing mechanism being configured to release meshing of the latch mechanism by a manual operating force; and a lock configured to switch between a locked state in which releasing meshing of the latch mechanism by an operation of the manual releasing mechanism is disabled and an unlocked state in which the releasing is enabled, wherein when the lock is in the locked state and the rotating cam rotates by a predetermined angle in the first direction from the reference position by power of the motor against the biasing force of the spring the electric releasing mechanism is configured to switch the lock from the locked state to the unlocked state by releasing meshing of the latch mechanism and configured to switch the lock from the unlocked state to the locked state when the rotating cam returns to the reference position by the biasing force of the spring from a position to which the rotating cam has rotated by the predetermined angle.

2. The device according to claim 1, wherein, the electric releasing mechanism is configured to switch the lock from the locked state to the unlocked state and return the rotating cam to the reference position by the biasing force of the spring, when the lock is in the locked state and the rotating cam rotates in the second direction from the reference position by power of the motor against the biasing force of the spring.

3. The device according to claim 1, wherein the lock includes an active lever configured not to regulate an angle of rotation of the rotating cam in the first direction when the lock is in the locked state, and to regulate an angle of rotation of the rotating cam in the first direction to the predetermined angle when the lock is in the unlocked state, and the electric releasing mechanism is configured to:
release meshing of the latch mechanism and return the rotating cam to the reference position by the biasing force of the spring, when the lock is in the locked state and the rotating cam rotates by a larger angle than the predetermined angle in the first direction from the reference position by power of the motor against the biasing force of the spring;

switch the lock from the locked state to the unlocked state and return the rotating cam to the reference position by the biasing force of the spring, when the lock is in the locked state and the rotating cam rotates in the second direction from the reference position by power of the motor against the biasing force of the spring; and switch the lock from the unlocked state to the locked state and return the rotating cam to the reference position by the biasing force of the spring, when the lock is in the unlocked state and the rotating cam rotates by the predetermined angle in the first direction from the reference position by power of the motor against the biasing force of the spring.

* * * * *